(12) United States Patent
Inai

(10) Patent No.: US 7,805,624 B2
(45) Date of Patent: Sep. 28, 2010

(54) ELECTRONIC DEVICE, AND EXTERNAL DEVICE CONTROL METHOD USING SAID ELECTRONIC DEVICE

(75) Inventor: Kento Inai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 816 days.

(21) Appl. No.: 11/695,192

(22) Filed: Apr. 2, 2007

(65) Prior Publication Data

US 2007/0242300 A1 Oct. 18, 2007

(30) Foreign Application Priority Data

Apr. 17, 2006 (JP) .............................. 2006-113748

(51) Int. Cl.
*G06F 1/32* (2006.01)
(52) U.S. Cl. ....................... 713/310; 713/320
(58) Field of Classification Search .......... 713/300–324
See application file for complete search history.

(56) References Cited

U.S. PATENT DOCUMENTS

| 6,467,042 | B1 | 10/2002 | Wright et al. |
| 6,665,801 | B1 | 12/2003 | Weiss |
| 7,197,578 | B1 * | 3/2007 | Jacobs ......................... 710/14 |
| 7,320,077 | B2 * | 1/2008 | Kim ............................ 713/300 |
| 2002/0091953 | A1 * | 7/2002 | Min ............................ 713/320 |
| 2003/0070103 | A1 | 4/2003 | Kim |
| 2004/0027400 | A1 * | 2/2004 | Ryu et al. ...................... 347/5 |
| 2005/0091549 | A1 | 4/2005 | Wu et al. |
| 2006/0117195 | A1 * | 6/2006 | Niwa et al. .................. 713/300 |
| 2007/0005824 | A1 | 1/2007 | Howard |

FOREIGN PATENT DOCUMENTS

| CN | 1405657 A | 3/2003 |
| EP | 1 487 197 A1 | 12/2004 |
| JP | 2001-067156 | 3/2001 |

OTHER PUBLICATIONS

The above references were cited in a Jul. 25, 2008 Chinese Office Action issued in the counterpart Chinese Patent Application 2007100981500.

* cited by examiner

*Primary Examiner*—Dennis M Butler
(74) *Attorney, Agent, or Firm*—Cowan, Liebowitz & Latman, P.C.

(57) ABSTRACT

The present invention realizes lower power consumption of an entire system in a case in which a battery operated electronic device such as an image pickup apparatus is used as a USB host machine. When a battery powered electronic device is connected via a cable to an external device that receives a supply of power from a host machine, which is the electronic device, the present invention provides a function to switch the external device to a low power consumption state under a predetermined condition, and a function to allow the external device to recover to an ordinary state. Also, a function is provided to check whether or not the low power consumption state of the external device satisfies the predetermined condition.

20 Claims, 14 Drawing Sheets

FIG. 8

< MENU SCREEN >

USB SUSPEND FUNCTION    | ON | OFF |

ELECTRONIC DEVICE, AND EXTERNAL DEVICE CONTROL METHOD USING SAID ELECTRONIC DEVICE

BACKGROUND OF THE INVENTION

1. Field of the Invention

The present invention relates to an electronic device, a method of controlling an external device using the electronic device, a program, and a storage medium, and more specifically relates to an electronic device that controls the power supply of a connected external device, a method of controlling the external device with the electronic device, a program, and a storage medium.

2. Description of the Related Art

As a method of connecting electronic devices to each other according to the related art, USB (universal serial bus) connections have become widespread. USB forms a connection with serial communications between a host machine and a plurality of external devices. For example, Japanese Patent Laid-Open No. 2001-67156 discloses technology related to the connection of a computer used as a host machine and a digital camera used as an external device.

A plug-and-play function (a function to automatically identify the connection relationship with an external device when the external device is newly connected or removed) is a feature of a USB connection. A USB connection is further characterized by having a hot-swap function (referred to as a livewire insertion/removal function, in which the external device can be connected or removed with power left turned on), and a power supply function to supply power to the external device. It is thought that with these functions, power supply and setting of an address and ID number when a user connects an electronic device and an external device are not burdensome.

Incidentally, in a USB connection, devices are connected with a special connector that connects a total of four electrical wires, including a 5V power source referred to as a VBUS, a ground line, and two signal lines D+ and D−. There is naturally a limit to the value of the current that can be supplied with the power source; the current is limited by USB connection standards to 100 mA to 500 mA. (However, the current value is 500 mA in the case of a device that requires power from a VBUS, and 100 mA in the case of a self-powered device.)

Also, in USB connection standards, it is defined that a connected device is required to switch to a suspend state, which is a low power consumption mode, due to a command from the host machine. In this suspend state, it is prescribed that the voltage consumption from the VBUS must be reduced to at least 500 μA. Also, there is a resume operation for recovering to a normal state from the suspend state. In USB connection standards, it is prescribed that a device with a USB connection recovers from the suspend state due to the host machine transmitting a resume signal for 20 milliseconds.

Conventionally, in a USB connection, a personal computer (also referred to as a PC) is used as a host machine. However, it has become possible to make a connection between all manner of electronic devices using a USB connection, and so there are instances when not only a PC but another electronic device is also used as a host machine. It is conceivable to connect an external device to that other electronic device. In that case, it is necessary that the other electronic device used as a host machine be able to supply power to the connected external device. As in the related art, when a PC is used as the host machine of a USB connection, adequate power supply is provided by the PC, so it is not necessary to pay much attention to power management.

However, when a battery operated portable electronic device such as a digital camera is used as the host machine of a USB connection, and an external device is connected to the portable electronic device, it is necessary to execute power management of the entire system configured from the portable electronic device and the external device. That is, in this sort of case, it is necessary to actively lower power consumption through the use of the above suspend state.

USB connection devices connected as an external device include many devices that do not meet USB standards for a suspend state. For example, at present there are devices that, even in a suspend state, require supply of a voltage greater than 500 μA from the host machine, and devices that cannot recover (resume) from the suspend state.

Also, among devices with a USB connection, in a device such as an HDD (Hard Disk Drive), when resuming, USB communications recover within a prescribed time. However, there are also devices that require at least a few seconds from the time that an internal magnetic disk begins to rotate until the time that actual read/write operation can be resumed. When, using such a device, shooting (i.e. image capture) is performed with a digital camera used as a host machine immediately after recovering from the suspend state, the timing of shooting may be affected. For an electronic device requiring a fast response such as a digital camera, the time from the suspend state until the device is usable is an important point that greatly affects performance.

SUMMARY OF THE INVENTION

The present invention was made in consideration of the problems described above, and relates to an invention that is particularly effective when a battery-operated electronic device such as a digital camera is used as the host machine of a USB connection. That is, a check is performed of whether a connected electronic device complies with suspend state in accordance with USB connection standards. If the connected electronic device satisfies those standards, when there is no access from the host machine to the connected electronic device, under certain predetermined conditions, the connected electronic device is forcibly switched to the suspend state.

Also, an acceptable recovery time can be set such that in the recovery time from the suspend state, the response performance of the connected electronic device itself is not restricted, and when an electronic device that requires more than the set recovery time is connected, the suspend state is not used.

Accordingly, the invention in its aspect realizes a system that identifies the state of an external device that is connected and supplied with power, performs power management, and realizes lower power consumption of the system as a whole.

The present invention in its first aspect provides an electronic device which comprises:

a connection unit configured to connect an external device to the electronic device;

a power supply unit configured to supply power to the external device via the connection unit;

a judgment unit configured to judge whether or not the external device connected to the connection unit satisfies a predetermined condition related to a low power consumption state; and a control unit configured, if the judgment unit judges that the predetermined condition is satisfied, to control the power supply unit so as to allow the external device to switch to the low power consumption state.

The present invention in its second aspect provides a method for an electronic device to control an external device, the method comprises:

a connection step arranged to connect an external device to the electronic device;

a power supply step arranged to supply power to the external device connected in the connection step;

a judgment step arranged to judge whether or not the external device connected in the connection step satisfies a predetermined condition related to a low power consumption state; and a control step, if it is judged in the judgment step that the predetermined condition is satisfied, arranged to control the supply of power so as to allow the external device to switch to the low power consumption state.

The present invention in its third aspect provides a program for performing the above-mentioned second aspect of the present invention.

The present invention in its fourth aspect provides a storage medium for storing the program for performing the above-mentioned second aspect of the present invention.

With the present invention, when a battery operated electronic device such as a digital camera is used as the host machine of a USB connection, it is possible to realize lower power consumption of the system as a whole. Also, due to the electronic device used as the host machine having a function to check whether a suspend state in accordance with USB connection standards is possible, it is possible to apply the suspend state more effectively, so lower power consumption can be realized.

Further features of the present invention will become apparent from the following description of exemplary embodiments with reference to the attached drawings.

BRIEF DESCRIPTION OF THE DRAWINGS

FIG. 8 shows a suspend function selection screen of the image pickup apparatus.

DESCRIPTION OF THE EMBODIMENTS

Embodiments of the present invention will now be described in detail with reference to the accompanying drawings.

Embodiment 1

The following is a description, by way of example, of an image pickup apparatus according to a first embodiment of the present invention.

Figure 1:
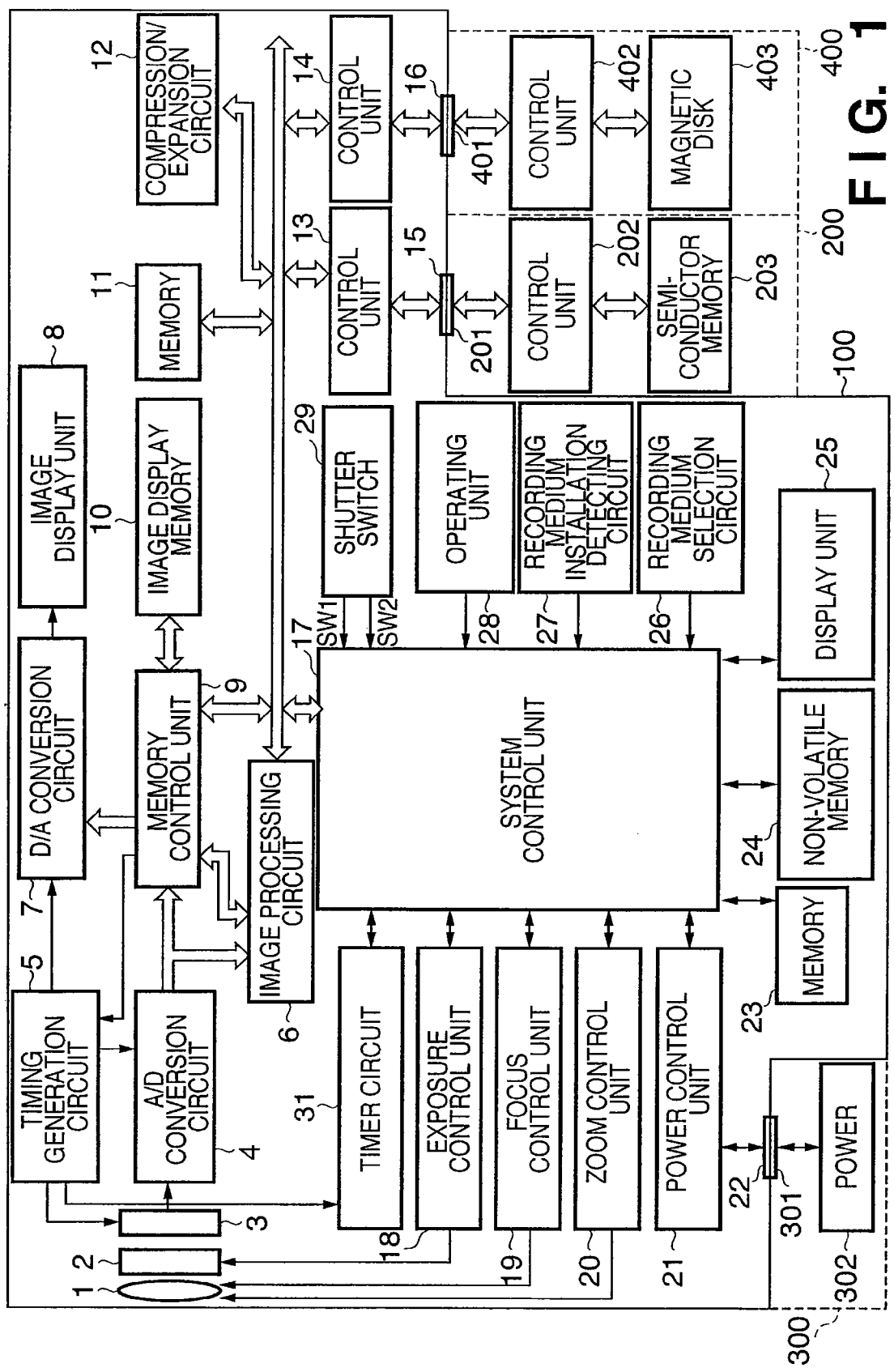
FIG. 1 is a block diagram that shows a functional configuration of an image pickup apparatus which is an electronic device according to an embodiment of the present invention.

In FIG. 1, reference numeral 100 is an image pickup apparatus, and functions for example as a so-called digital camera. Also, reference numeral 1 is a shooting lens, reference numeral 2 is a shutter provided with an aperture function, reference numeral 3 is an image pickup device that converts an optical image into an electrical signal, and reference numeral 4 is an A/D conversion circuit that converts analog signal output of the image pickup device 3 into a digital signal.

Reference numeral 5 is a timing generation circuit that supplies a clock signal and various control signals to the image pickup device 3, the A/D conversion circuit 4, a D/A conversion circuit 7, and the like, and is controlled by a memory control unit 9 and a system control unit 17. Further, reference numeral 31 is a timer circuit, and constitutes a timer for measuring a time interval using the clock signal supplied by the timing generation circuit 5 which operates according to control by the system control unit 17. Alternatively, the timer circuit 31 may be configured to count a real time clock (not shown) used by the system control unit 17.

Reference numeral 6 is an image processing circuit, and performs a predetermined pixel interpolation process and color conversion process on image data from the A/D conversion circuit 4 or the memory control unit 9. Also, in the image processing control circuit 6, a predetermined computation process for control is performed using captured image data. Based on the computation results obtained, the system control unit 17 controls an exposure control unit 18 and a focus control unit 19, thus performing a TTL-type (through-the-lens) AF (auto-focus) process, an AE (automatic exposure) process, and an EF (flash pre-firing) process. Further, in the image processing circuit 6, a predetermined computation process is performed using the captured image data, and a TTL-type AWB (auto white balance) process is performed based on the obtained computation results.

Also, reference numeral 9 is a memory control unit, and controls the A/D conversion circuit 4, the timing generation circuit 5, the image processing circuit 6, an image display memory 10, the D/A conversion circuit 7, a memory 11, and a compression/expansion circuit 12. The image data from the A/D conversion circuit 4 is written to the image display memory 10 or the memory 11 via the image processing circuit 6 and the memory control unit 9, or the image data from the A/D conversion circuit 4 is written to the image display memory 10 or the memory 11 directly via the memory control unit 9. Also, reference numeral 10 is an image display memory, reference numeral 7 is a D/A conversion circuit, and reference numeral 8 is an image display unit configured from a TFT-type LCD or the like. Image data for display written to the image display memory 10 is supplied to the image display unit 8 via the D/A conversion circuit 7 and displayed. Reference numeral 11 is a memory for storing still image data or moving image data that has been shot, and is provided with an adequate amount of storage to store a predetermined number of still images or a predetermined time of moving images. Shot image data is first saved to the memory 11, and then recorded to a recording medium by a recording medium selection circuit 26 and the system control unit 17. Also, the memory 11 is, for example, memory with a RAM structure, and can be used also as a work area of the system control unit 17.

Reference numeral 12 is a compression/expansion circuit that compresses or expands image data using the adaptive discrete cosine transform (ADCT) algorithm or the like. The compression/expansion circuit 12 reads image data stored in the memory 11, performs a compression process or an expansion process, and rewrites the processed image data to the memory 11. Reference numeral 18 is an exposure control unit that controls the shutter 2 provided with an aperture function. Reference numeral 19 is a focus control unit that controls focusing of the shooting lens 1, and reference numeral 20 is a zoom control unit that controls zooming of the shooting lens 1. The exposure control unit 18 and the focus control unit 19 are controlled using a TTL method as described above. That is, control is performed by the system control unit 17 based on the computation results of computing shot image data with the image processing circuit 6.

Reference numeral 17 is a system control unit that performs overall control of the image pickup apparatus 100, and reference numeral 23 is a memory that stores constants, variables, programs, and the like for operation of the system control unit 17. Reference numeral 25 is a display unit including a speaker and a liquid crystal display (LCD) that, for example, displays an operating state or a message or the like using text data, image data, audio data, or the like in response to execution of a program by the system control unit 17. These are provided at one or a plurality of easily-viewed locations in the vicinity of an operating unit 28 of the image pickup apparatus 100, and for example, configured by combining an LCD panel, an LED, a sound-emitting device, and the like.

The display of the display unit 25 includes a single shot/continuous shooting display, a self-timer display, a compression ratio display, a recorded pixels number display, a recorded images number display, an available shooting number display, a shutter speed display, a flash display, a red-eye reduction display, and the like. In addition, the display includes a macro shooting display, a buzzer setting display, a clock battery amount remaining display, a battery amount remaining display, an error display, a multiple-digit number information display, an installation state information display for recording devices 200 and 400, a communications I/F operation display, a date/time display, and the like. Further, the display may be allowed to include a focus display, a camera-shake warning display, a flash charging display, an aperture value display, an exposure correction display, and the like. Reference numeral 24 is a non-volatile memory capable of being electrically deleted or recorded, where, for example, an EEPROM or the like is used.

Also, reference numeral 29 includes a shutter switch SW1 and a shutter switch SW2. The shutter switch SW1 is ON during operation of an unshown shutter button, and instructs to start operation of the AF (auto-focus) process, the AE (automatic exposure) process, the AWB (auto white balance) process, the EF (flash pre-firing) process, and the like. The shutter switch SW2 is on when operation of the unshown shutter button is complete. Thus, an exposure process is performed that takes a signal read from the image pickup device 3 and writes it as image data to the memory 11 via the A/D conversion circuit 4 and the memory control unit 9, and a development process is performed using the computation by the image processing circuit 6 and the memory control unit 9. Further, the start of operation of a process sequence is instructed, namely a recording process in which image data is read from the memory 11, compression is performed by the compression/expansion circuit 12, and the image data is written to the recording device 200 or 400.

Also, driving control of the recording devices 200 and 400 can be performed with the system control unit 17 and the control units 13 and 14 according to the timings at which the shutter switches SW1 and SW2 are made ON.

Reference numeral 28 is an operating unit configured from various buttons and a touch panel and the like, and includes, for example, a menu button, a set button, a macro button, a multi-screen page button, a flash set button, and a single/continuous/self-timer set button. Also included, for example, are a menu shift + (plus) button, a menu shift − (minus) button, a playback image shift + (plus) button, a playback image shift − (minus) button, a shooting image quality selection button, an exposure correction button, and a date/time setting button.

Reference numeral 21 is a power control unit, and is configured from a battery detecting circuit, a DC-DC converter, a switching circuit that switches the block to which power is applied, and the like. The power control unit 21 detects whether or not a battery is installed, the type of battery, and the remaining battery amount, and controls the DC-DC converter based on the results of this detection and instruction of the system control unit 17. Thus, power is supplied to each portion including a recording medium for a necessary amount of time and with a necessary voltage. Reference numeral 22 indicates a connector for connection. Reference numeral 300 indicates a power unit. Reference numeral 301 is a connector that is connected to the connector 22, and reference numeral 302 is a power supply configured from a primary battery such an alkaline or lithium battery, a secondary battery such as a NiCd battery, NiMH battery, or Li battery, an AC adapter, and the like.

Reference numerals 13 and 14 are control units that control a recording medium such as a memory card or a hard disk, and reference numerals 15 and 16 are connectors that form a connection with a recording medium such as a memory card or a hard disk. Reference numeral 27 is a recording medium installation detecting circuit that detects whether or not the recording device 200 or the recording device 400 is connected to the connector 15 and/or 16.

Reference numeral 26 is a recording medium selection circuit used when selecting a recording destination for shot image data from among a plurality of recording media. The recording medium selection circuit 26 may be configured with, for example, a switch, or a menu button used to make a selection.

In the present embodiment, an example is described in which there are two control units and two connectors used to install a recording medium. Of course, a configuration may be adopted in which there is any number (one or a plurality) of controller-connector systems used to install a recording medium. A configuration provided with a combination of a control unit and a connector with differing standards is also possible. The recording device 200 is a recording device such as a memory card or a hard disk. Here, the recording device 200 is a memory card configured from a semiconductor memory. The recording device 200 is provided with a recording unit 203 configured from the semiconductor memory, a control unit 202 that controls the recording unit 203 and is an interface with the image pickup apparatus 100, and a connector 201 that forms a connection with the image pickup apparatus 100.

Also, the recording device 400 is a recording device such as a memory card or a hard disk. Here, for example, the recording device 400 is an HDD with a USB connection. The recording device 400 is provided with a recording unit 403 configured from a magnetic disk, a control unit 402 that controls the recording unit 403 and is an interface with the image pickup apparatus 100, and a connector 401 that forms a connection with the image pickup apparatus 100.

Figure 2:
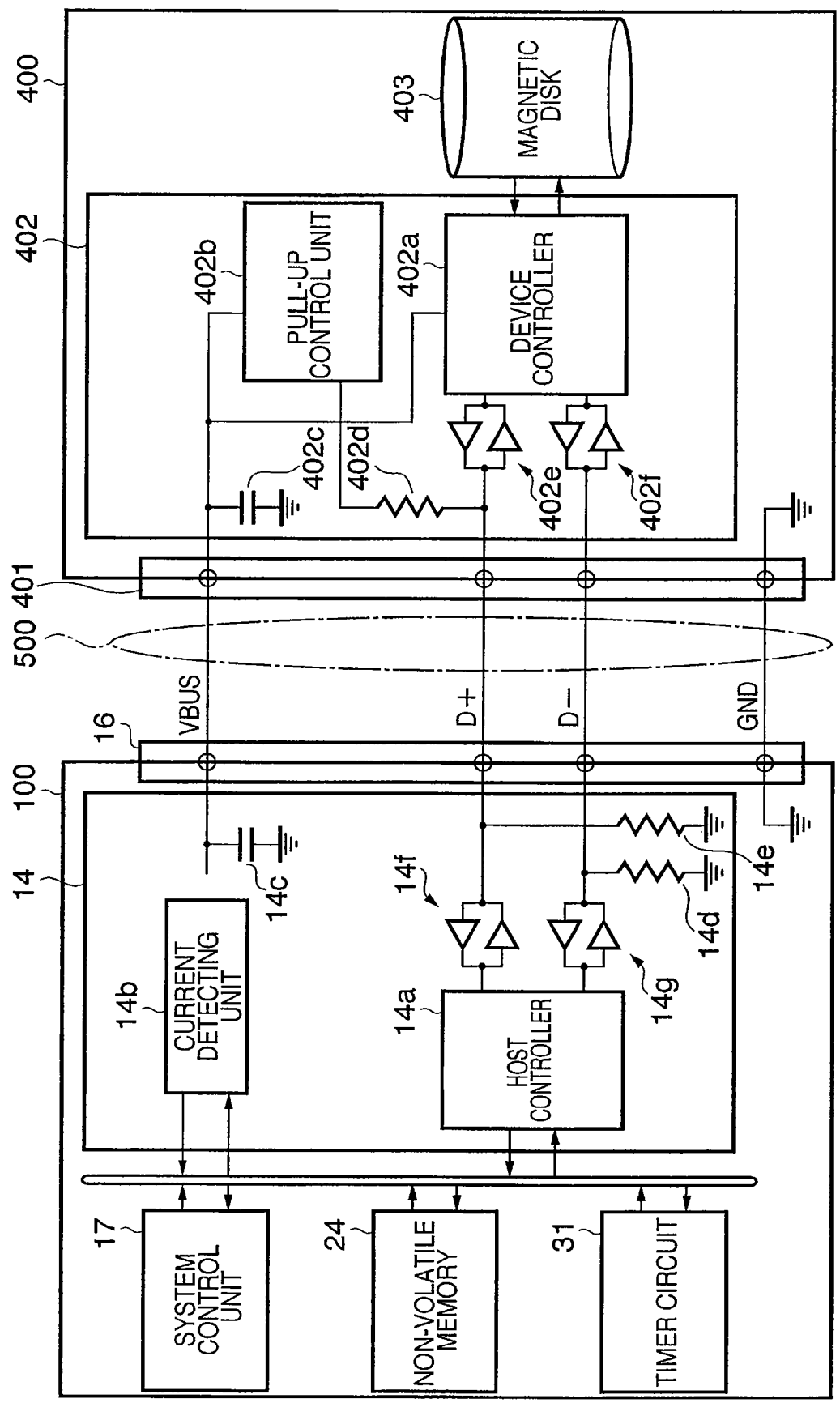
FIG. 2 is a block diagram that shows details of an interface portion of a USB connection of the image pickup apparatus which is an electronic device according to an embodiment of the present invention.

FIG. 2 is a detailed view of a case in which the interface between the recording device 400 and the image pickup apparatus 100 in the embodiment shown in FIG. 1 is a USB connection. Shown here is a functional block diagram of relevant portions in an embodiment in which the image pickup apparatus 100, which is an electronic device, is used as the host machine of the USB connection, and the recording medium 400 is used as the external device of the USB connection.

First, the detailed configuration of the control unit 14 will be described below. Reference numeral 14a is a host controller for realizing a function whereby the image pickup apparatus 100 is the host machine of the USB connection. The host controller 14a controls transmission and receipt of data packets, and is configured with an IC that governs control of the USB connection. Reference numeral 14b is a current detecting unit that detects the current that flows through the VBUS line from the side of the image pickup apparatus 100, which is the host machine, to the side of the recording device 400, which is the external device. The current detecting unit 14b is configured with a power switch IC, or an A/D conversion circuit or the like. The current detecting unit 14b monitors the maximum acceptable current value 500 mA during normal operation and the maximum acceptable current value 500 μA when switched to the suspend state, and thus is able to check whether or not a switch has been made to the suspend state in accordance with USB standards. Reference numeral 14c is a bypass condenser for the VBUS line. When forming a USB connection, power is supplied to the side of the recording device 400, which is the external device.

Reference numerals 14d and 14e are pull-down resistors. The USB standards prescribe that the D+ and D− lines are pulled down on the host machine side. Reference numerals 14f and 14g are input/output buffers. Reference numeral 500 is a USB cable. Here, an example is shown of communications via a wired USB connection. As described above, the recording device 400 is configured with the connector 401, the control unit 402, the magnetic disk 403, and the like. The detailed configuration of the control unit 402 is described below.

Reference numeral 402a is a device controller for realizing the function of the external device connected via the USB connection. The device controller 402a has a function to observe communications from the image pickup apparatus 100, and respond to a request from the image pickup apparatus 100. Reference numeral 402b indicates a pull-up control unit, and has a function to pull up a pull-up resistor 402d via the VBUS or with self-power (AC power). Reference numeral 402c is a bypass condenser for stabilizing the power supplied from the side of the image pickup apparatus 100, which is the host machine, through the VBUS line. Reference numerals 402e and 402f are input/output buffers.

Below is a description of a sequence for controlling the image pickup apparatus 100 with the configuration shown in FIGS. 1 and 2, given as an embodiment of the present invention.

Figure 3:
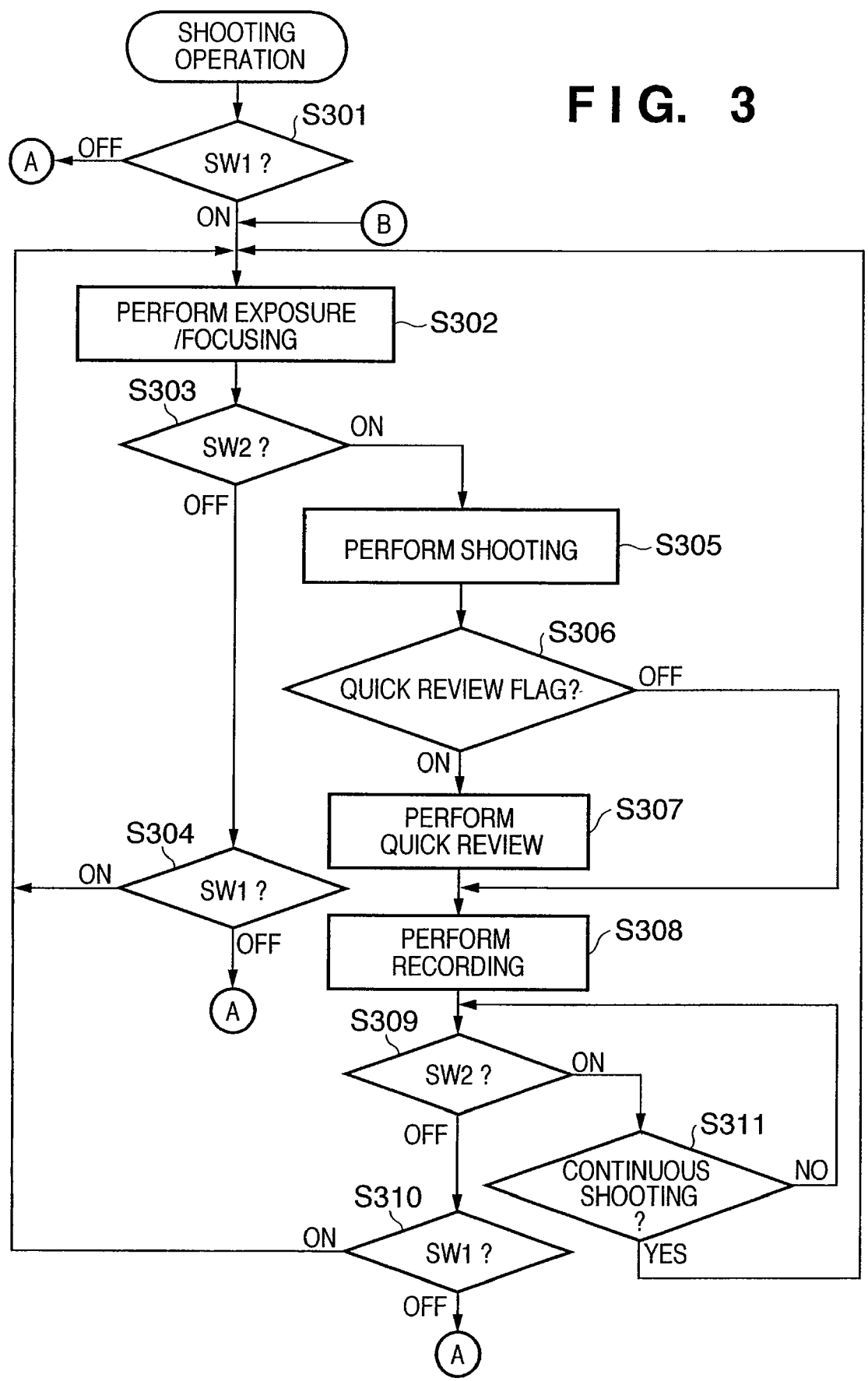
FIG. 3 is a sequence diagram showing the sequence during a shooting operation of the image pickup apparatus which is an electronic device according to an embodiment of the present invention.

FIG. 3 shows the sequence of the image shooting operation. First, in Step S301, a branch process is performed of whether or not the shutter switch SW1 has been pressed, and if it has been pressed, the sequence advances to Step S302, and exposure and focusing processes are performed. However, if the shutter switch SW1 has not been pressed, the sequence moves to Sequence A. Sequence A is described below.

After the exposure and focusing processes in Step S302 are finished, the sequence then advances to Step S303, where a branch process is performed on whether or not the shutter switch SW2 has been pressed. If it has been pressed, the sequence advances to Step S305, and moves to an image shooting process. On the other hand, if the shutter switch SW2 has not been pressed, again a check is performed of whether the shutter switch SW1 is pressed in Step S304. If the shutter switch SW1 has been pressed, the sequence returns to Step S302 and the exposure and focusing processes are performed again, and if the shutter switch SW1 has not been pressed, the sequence moves to Sequence A.

When the shutter switch SW2 has been pressed in Step S303, the sequence advances to Step S305, image shooting is performed. After the image shooting process in Step S305 finishes, the sequence advances to Step S306. When a quick review setting has been set by a flag, the shot image is displayed on the display unit 8 with the process in Step S307. If a quick review setting has not been set, Step S307 is skipped. Settings for whether or not there is a quick review, continuous display time of the quick review, and the like can be set in the digital camera, which is the image pickup apparatus 100.

In Step S308, the image data shot in Step S305 is recorded to the recording medium designated by the recording medium selection circuit 26 in FIG. 1. Below, it is assumed that the magnetic disk 403 of the recording device 400 connected externally with the USB connection has been selected.

Next, when a check is performed of whether the shutter switch SW2 is pressed in Step S309, and in Step S311 it has been confirmed that continuous shooting operation is designated, the sequence again returns to Step S302, where the exposure and focusing processes are performed. However, when continuous shooting operation is not designated in Step S311, the sequence returns to Step S309, and a check is performed of whether the shutter switch SW2 has been released. When the shutter switch SW2 has been released, the sequence advances to Step S310, and again a check is performed of whether or not the shutter switch SW1 is pressed. In this case, when the shutter switch SW1 is being pressed, the sequence returns to the exposure and focusing processes of Step S302, and the same process is performed. However, when the shutter switch SW1 is not being pressed, the sequence moves to Sequence A.

Figure 4A:
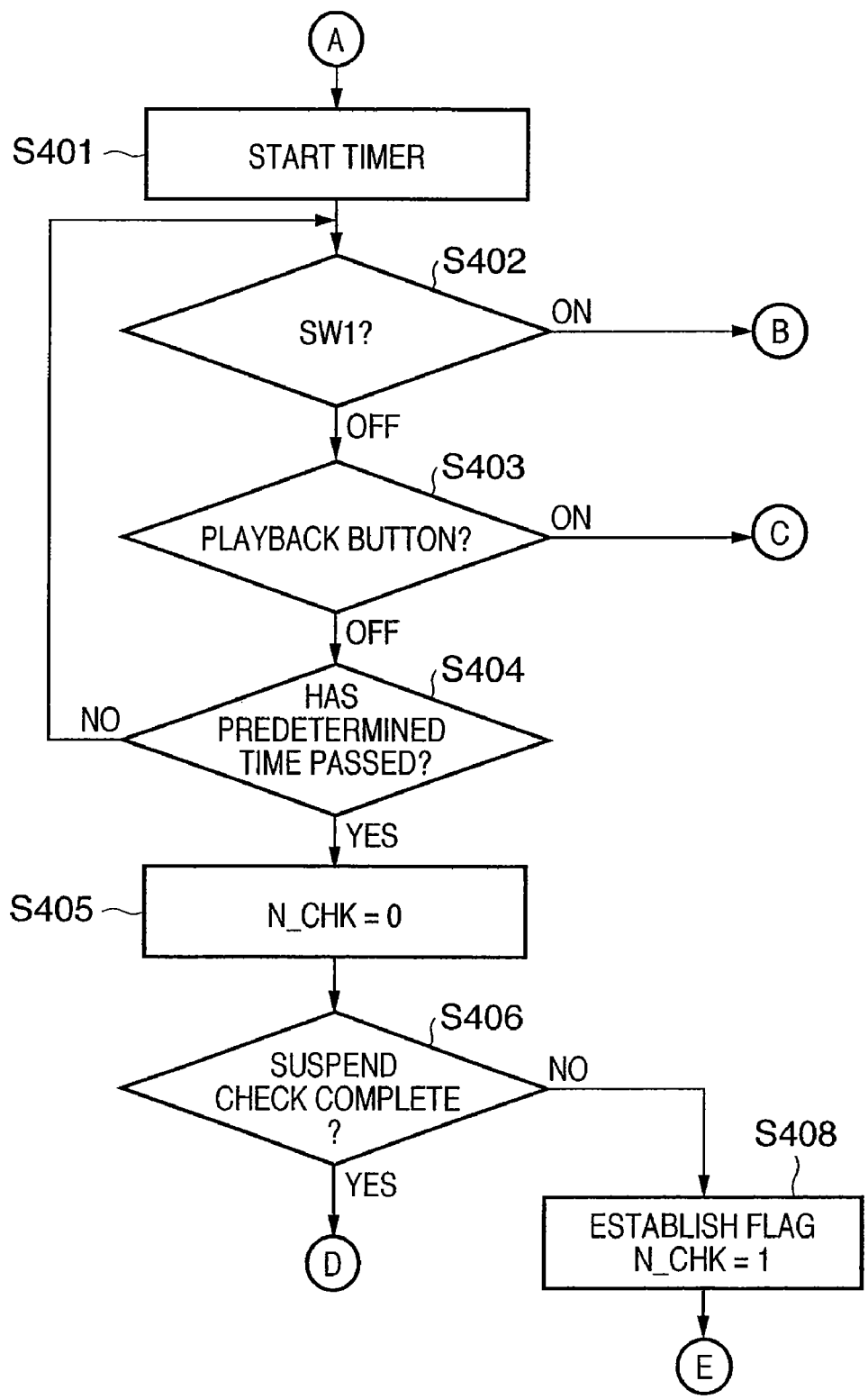
FIGS. 4A and 4B are sequence diagrams showing the timing of switching to the suspend state of the image pickup apparatus which is an electronic device according to an embodiment of the present invention.
Figure 4B:
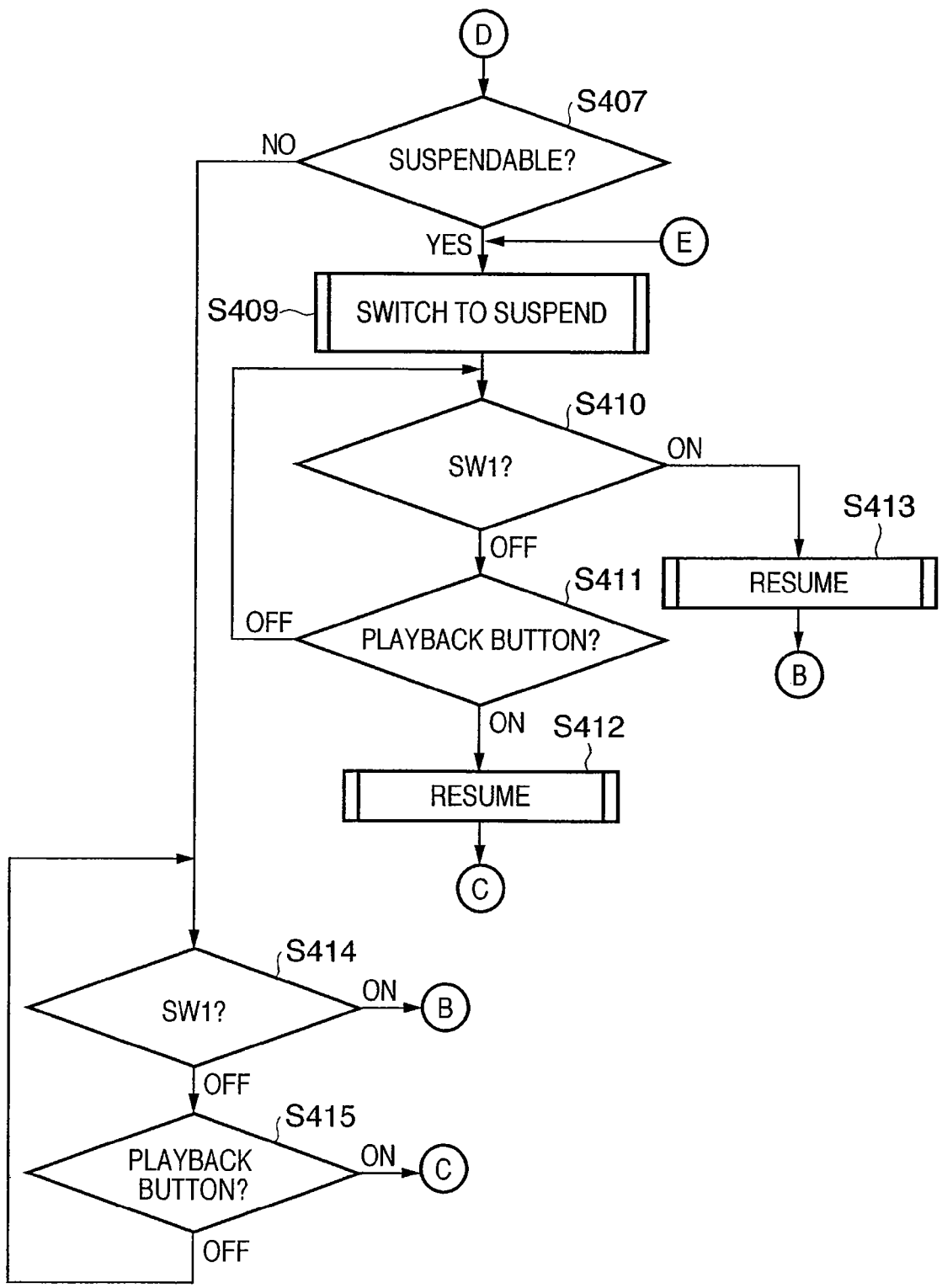

Next is a description of Sequence A shown in FIGS. 4A and 4B. This sequence is an example in which when there is no image shooting operation or image playback in the image pickup apparatus 100 for a predetermined time, the image pickup apparatus switches to the suspend state.

First, in FIG. 4A, when the shutter switch SW1 for the image shooting operation is not pressed, or when a playback button for the image playback operation is not pressed, the timer circuit 31 is started in order to measure a predetermined time as indicated in Step S401.

When the shutter switch SW1 has been pressed or when the playback button for image playback has been pressed during measurement of the predetermined time, this is detected in Step S402 or Step S403, and a branch process is performed such that it is possible to move to each process. In Step S404, a check is performed of whether or not the predetermined time has passed, and after the predetermined time has passed, a check is performed of whether or not the connected recording device 400 (here, the magnetic disk 403) has completed a suspend check.

That is, first, in Step S405, a flag (N_CHK) is initialized that indicates that the magnetic disk 403 of the recording device 400, which is the external device connected with the USB connection, has completed a check of whether suspend conditions are satisfied. Next, the sequence advances to Step S406, where a check is performed of whether or not the suspend check is complete. Here, information of whether or not the recording device 400, which is the external device connected with the USB connection, is compatible with the suspend state is stored in the non-volatile memory 24 in the image pickup apparatus 100 along with an identification number for the recording device 400.

Figure 11:
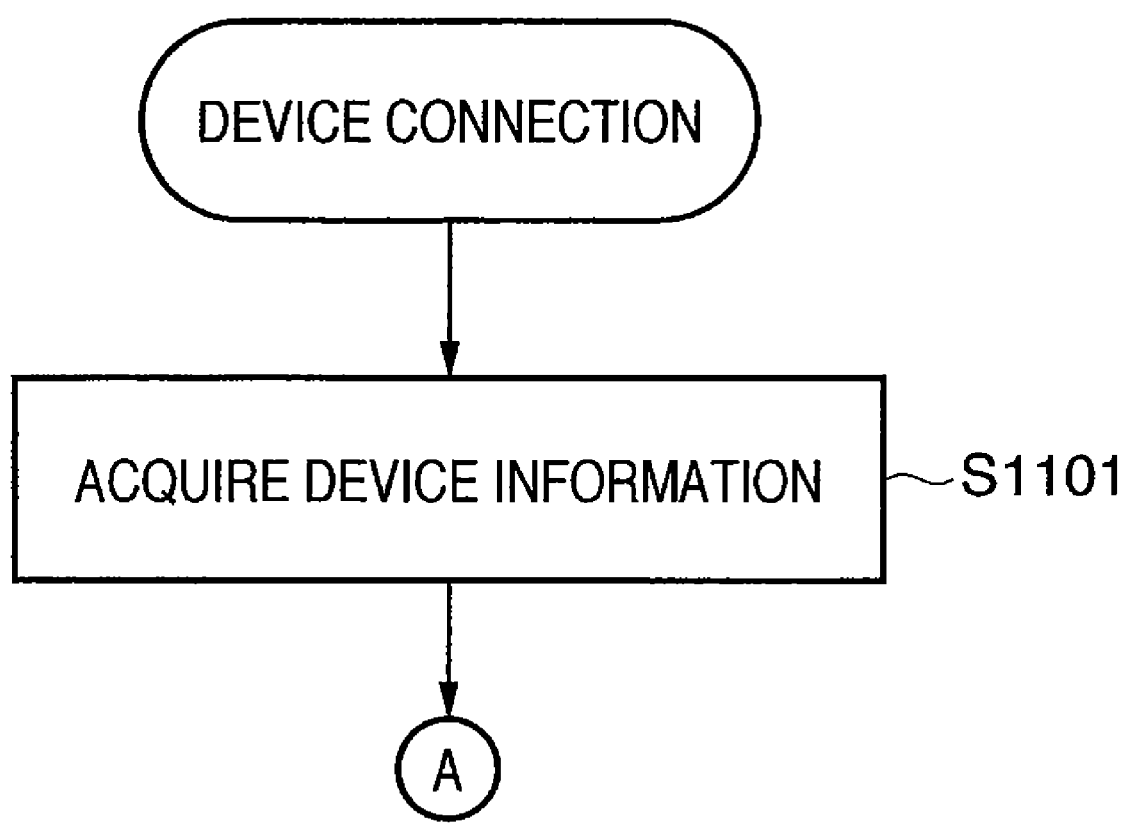
FIG. 11 is a sequence diagram that shows a process performed during a USB connection of the image pickup apparatus.

The identification number referred to here is obtained when acquiring device information in Step S1101 of the sequence performed when the recording device 400 has been connected with the USB connection, shown in FIG. 11. The USB connection includes a procedure that acquires information referred to as a descriptor of the external device when enumeration is performed when making the connection. The descriptor includes a large amount of information relating to the external device such as the name of the device manufacturer and a serial number of the device.

Accordingly, by storing whether each recording device 400 is suspendable or non-suspendable in the non-volatile memory 24, it is possible to check whether or not the suspend check has been performed. Thus, it is possible to omit second and subsequent instances of the suspend check. Of course, it is also possible to execute the suspend check every time a USB connection is formed in order to increase reliability. With respect to an external device that has been connected for the first time, in Step S408 the N_CHK flag is established and the fact that the suspend check of whether or not the device is suspendable has not been performed is stored. Next, in FIG. 4B, when the suspend check has previously been performed, a check is performed of whether or not that external device is suspendable in Step S407. When the external device is suspendable, the sequence advances to Step S409, and moves to processing for switching to the suspend state. However, with respect to an external device that is non-suspendable, in Steps S414 and S415 a check is performed of whether or not there is no image shooting operation or image playback operation. Accordingly, when the shutter switch SW1 or the playback button has been pressed, the sequence moves to Sequence B for processing that corresponds to the shutter switch SW1 or Sequence C for processing that corresponds to the playback button.

Here, with respect to a non-suspendable external device, no particular processing is performed, but when power consumption is excessively large, it is effective to display a warning prompting the user that the external device cannot be used, or to limit usable external devices. The details of processing to switch to the suspend state will be given below.

After switching to the suspend state in Step S409, a check is performed in Steps S410 and S411 of whether or not there is an image shooting operation or an image playback operation in the image pickup apparatus 100. When there has been an operation the sequence moves respectively to a resume process in Steps S412 and S413 in order to recover from the suspend state to the ordinary state. The details of the resume process will be given below.

Figure 5:
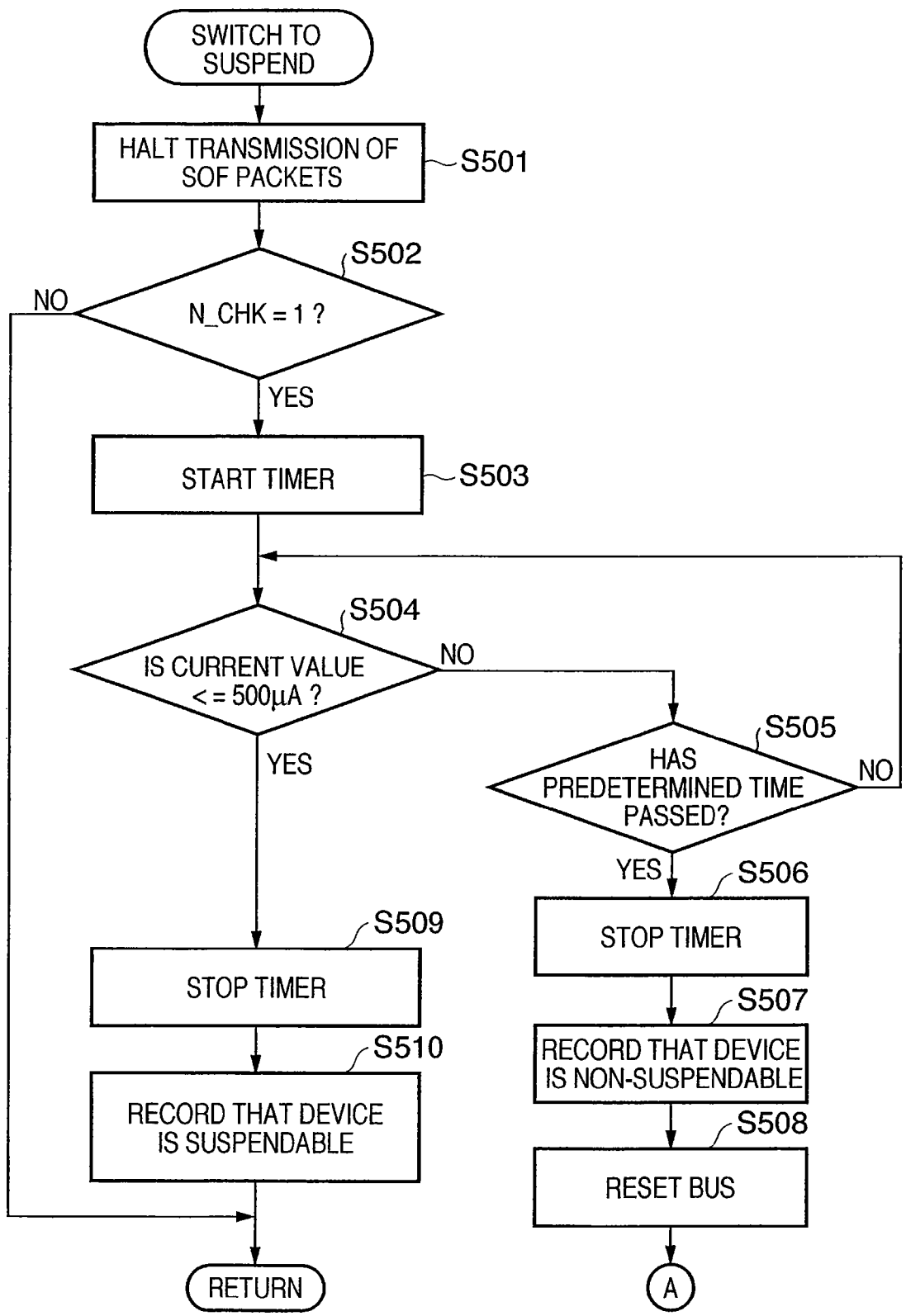
FIG. 5 is a sequence diagram showing the process that switches to the suspend state of the image pickup apparatus which is an electronic device according to an embodiment of the present invention.

Next is a description of the sequence to switch to the suspend state shown in FIG. 5. In the full/high speed USB standards, it is prescribed to switch to the suspend state when no packets have reached the device side from the host machine of the USB connection in a time interval of three milliseconds. In the USB standards, the current value consumable from the VBUS during normal operation is 500 mA, and during the standby state is 500 μA. (However, with respect to a self-powered device, the current value consumable from the VBUS during normal operation is 100 mA, and during the standby state is 100 μA.) The function of the host controller 14a of the USB connection shown in FIG. 2 is provided with a function to transmit SOF (start-of-frame) packets at particular intervals such that there is not an unintentional switch to the suspend state. Conversely, by halting transmission of SOF packets, it is possible to switch the bus to the suspend state.

Accordingly, in FIG. 5, first in Step S501, transmission of SOF packets is halted. Then, advancing to Step S502, a branch is performed according to the N_CHK flag indicating whether or not execution of the suspend check is complete. When the suspend check is complete there is an escape (return) from this sequence without doing anything further. When the suspend check has not yet been performed, the sequence advances to Step S503, and a timer is started using the timer circuit 31 of FIG. 1 in order to measure the suspend switch time. Here, as an example, in Step S504 the current value of the VBUS line is monitored, and a judgment is performed of whether or not a switch has been made to the suspend state according to whether or not the current value is not greater than 500 μA in the suspend state.

For an external device whose current value does not fall even after passage of a fixed period of time, the timer is stopped in Step S506 as a time out, and in Step S507 non-suspendable is recorded in the non-volatile memory 24 in the image pickup apparatus 100. If the recording device 400 is a non-suspendable device, in Step S508 the bus is once reset, and after restarting, the sequence moves to Sequence A.

For a recording device 400 with respect to which it could be confirmed that the current value is not greater than the prescribed value of 500 μA in Step S504, the timer is stopped in Step S509 as a time out. Then, in Step S510, suspendable is recorded in the non-volatile memory 24 in the image pickup apparatus 100, and there is an escape (return) from this sequence. Here, the reference current value is 500 μA, but it is also possible to set a desired current value in consideration of the power consumption of the overall system of the image pickup apparatus 100.

Figure 6A:
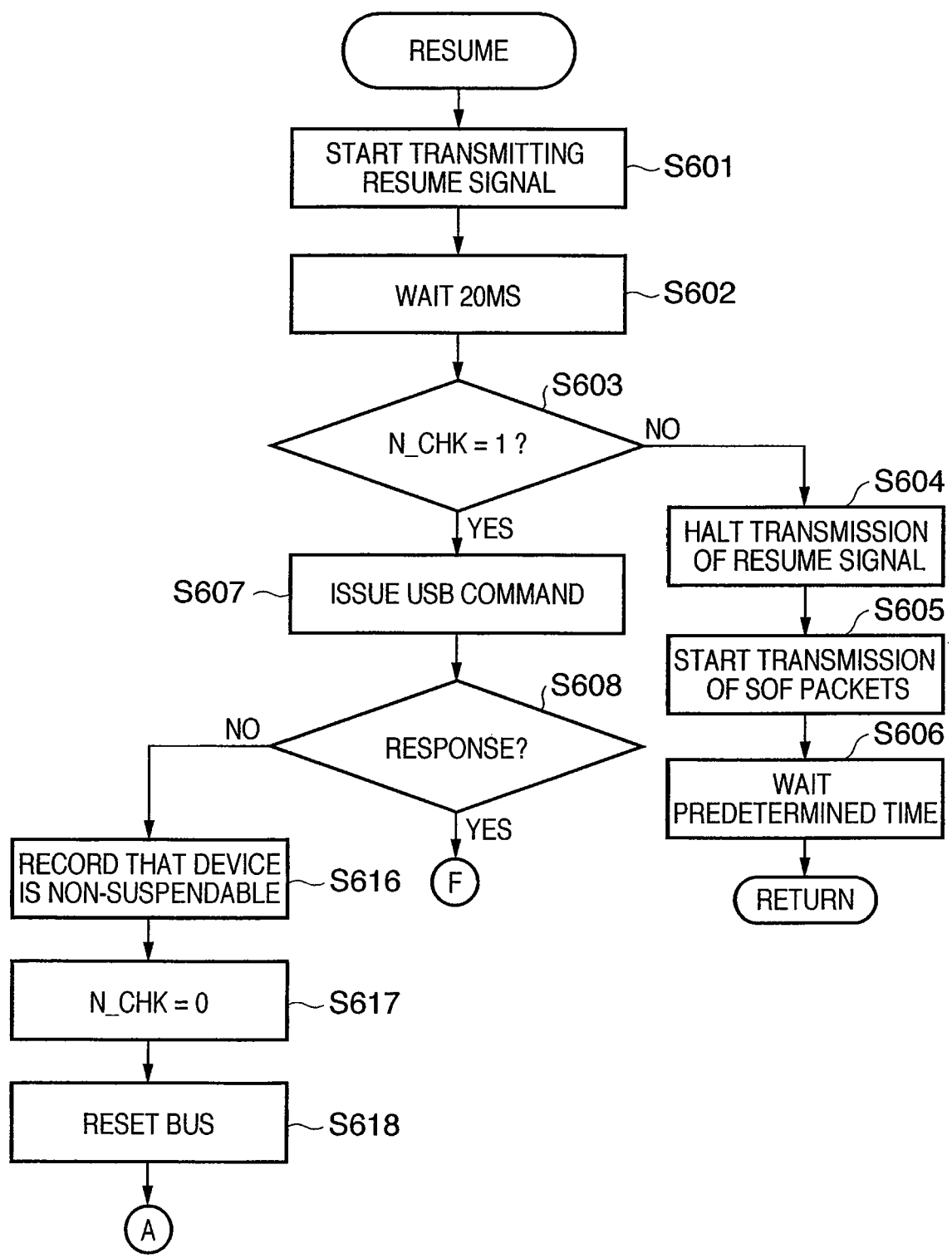
FIGS. 6A and 6B are sequence diagrams showing a resume process of the image pickup apparatus which is an electronic device according to an embodiment of the present invention.
Figure 6B:
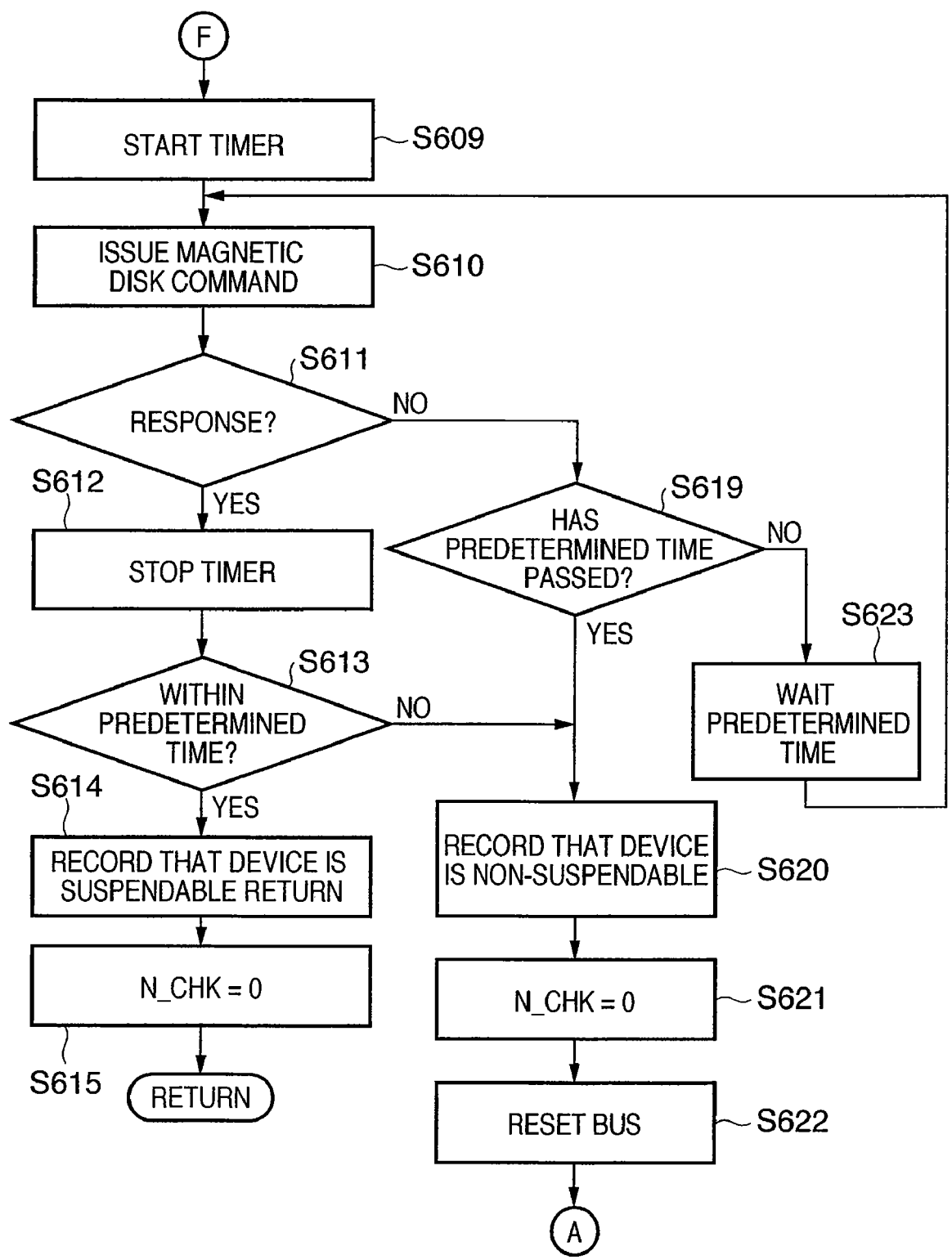

FIGS. 6A and 6B are sequence diagrams that show the resume sequence. Resume means a process for allowing a bus in the suspend state to recover to the ordinary state, and by resuming the communications of the USE connection are resumed. A bus in the suspend state is set up so that when the host machine sends a resume signal for 20 milliseconds, the device-side resumes USB communications within 1 to 15 milliseconds. However, when considering a device such as an HDD as the device connected with the USB connection, there are some devices for which, even if it is possible for USB communications to resume within 1 to 15 milliseconds, at least a few seconds are required for a magnetic disk in a sleep state to resume rotation and enter a state in which reading or writing is possible. The reason is that recording devices configured with a HDD often enter a stopped state when the bus is in the suspend state, for the sake of energy conservation.

So, in this sequence, at the same time as checking whether or not the bus can properly recover from the suspend state to the ordinary state, a measurement is performed of the recovery time until the magnetic disk 403 of the recording device 400 enters a usable state. The reason is that startup time is an important factor for the image pickup apparatus 100, so it is necessary to adopt a measure such as not using suspend for a device whose startup time is longer than a predetermined time.

In FIG. 6A, first, a resume signal is sent for 20 milliseconds in Steps S601 and S602. The resume signal is a signal with differential 0 in a full/high speed USB connection. A differential 0 signal is a signal in which the D+ line is low and the D− line is high. Next, in Step S603, a check is performed of whether or not the suspend check is completed. If the check is completed, the sequence moves to Step S604, and transmission of the resume signal is halted. Afterward, in Step S605, transmission of SOF packets at a fixed interval starts such that the bus does not reenter the suspend state, and then the sequence advances to Steps S606, where the sequence returns to the main sequence after waiting for a predetermined time as a startup wait time for the magnetic disk 403.

On the other hand, when the suspend check has not yet been executed in Step S603, the sequence advances to Step S607 in order to check whether or not communications of the USB connection have resumed, and a USB command is issued. Then, in Step S608, the response to the USB command is viewed, and a check is performed of whether or not USB communications have properly recovered. When there is no response from the external device or the response was not proper, the sequence advances to Step S616, non-suspendable is recorded in the non-volatile memory 24 in the image pickup apparatus 100, and in Step S617 suspend check complete is also recorded. Afterward, in Step S618 the USB bus is reset so that communications of the USB connection are allowed to resume.

On the other hand, when there was a response from the external device in Step S608, this indicates that communications of the USB connection have properly recovered. So, in order to measure the time until the magnetic disk 403 returns to a state in which reading and writing is possible, the timer circuit 31 is started in Step S609 in FIG. 6B. Next, in Step S610, a magnetic disk command is issued, and in Step S611 the response of the recording device 400 is checked. When there is a response from the recording device 400, the timer operation is stopped in Step S612, and the measurement time is stored. When there is a response from the recording device 400 and the recovery time is within the predetermined time in Step S613, in Steps S614 and S615 the fact that the recording device 400 is suspendable is recorded in the non-volatile memory 24 in the image pickup apparatus 100. Further, it is recorded that the suspend check is completed.

Conversely, when recovery was not accomplished within the predetermined time, in Step S620, it is recorded that the recording device 400 is non-suspendable in the non-volatile memory 24 of the image pickup apparatus 100. Here as well, in Step S621, it is recorded that the suspend check is completed. Then, in Step S622, the USB bus is reset in order to restart the bus. When, in previous Step S611, there was no response from the recording device 400 or there was not a proper response, the time out is referenced in Step S619. If within the time out time, in Step S623, a predetermined time is waited for the recording device 400 to be able to start up, the sequence again moves to Step S610, and a magnetic disk command is issued. When the time out time of Step S619 was exceeded, the sequence moves to Step S620 and the same processing as described above is performed.

Figure 7:
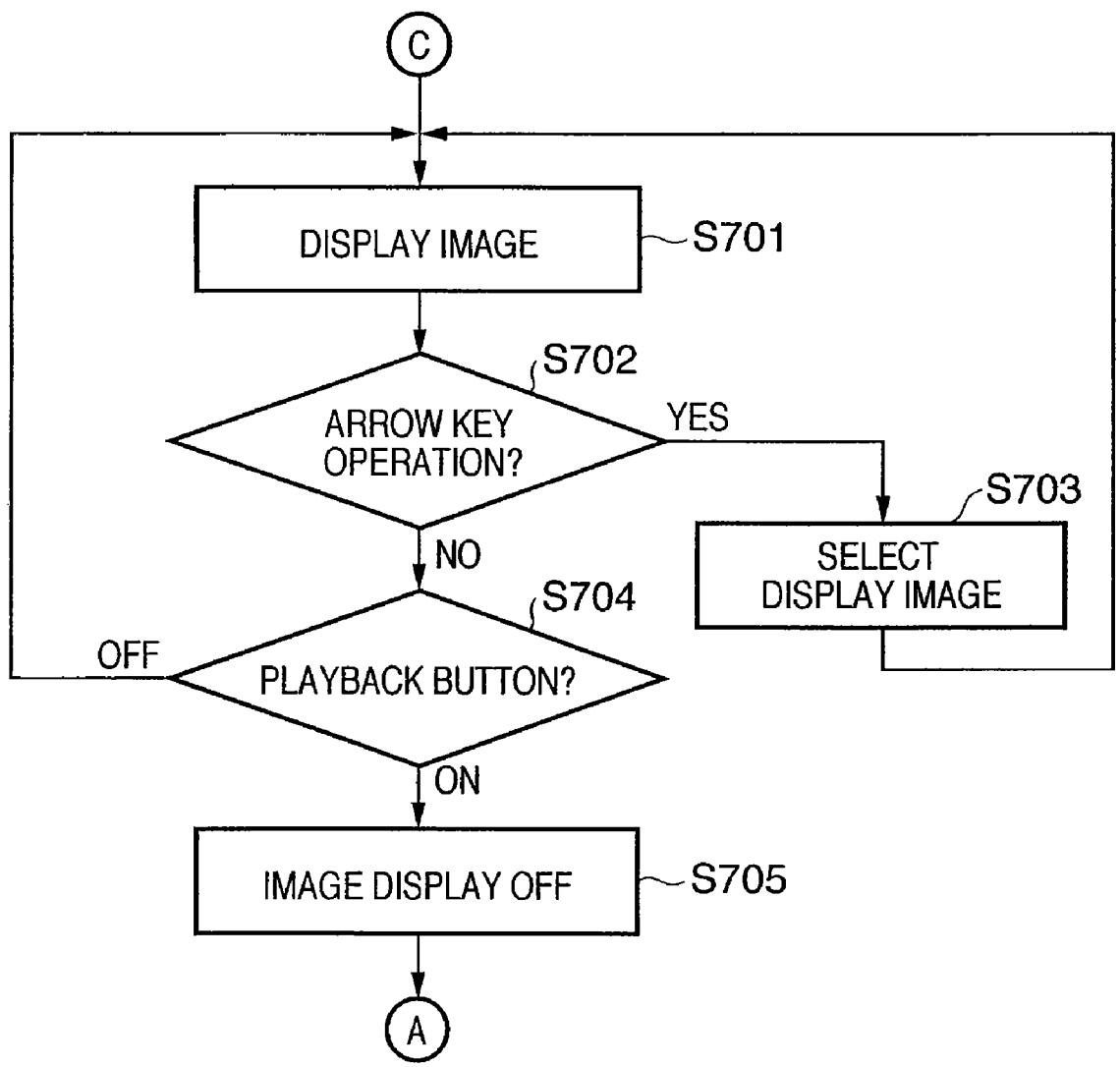
FIG. 7 is a sequence diagram showing an image playback process of the image pickup apparatus.

FIG. 7 shows Sequence C. This sequence is for playback of image data saved when the playback button was pressed. When the playback button is pressed, in Step S701, the most recently shot image is, for example, displayed on the image display unit 8. Next, when there was operation of an operating member of an arrow key or the like this is detected in Step S702. In Step S703, the image data can be selected with an arrow key, and returning to Step S701, the selected image data is displayed. Here, an arrow key is given as an example of the operating member, but the operating member is not limited to being an arrow key. When there is not operation of an arrow key, and in Step S704, it is detected that the playback button has been repressed, the sequence advances to Step S705, display of image displayed at that time is switched off, and the sequence returns to Sequence A. Although not shown here, when the shutter switch SW1 has been pressed, there is recovery from the image playback sequence at a desired timing, and then processing shifts to the image shooting sequence.

Embodiment 2

In the suspend state, power consumption is greatly suppressed, and so application of suspend is a great advantage to the image pickup apparatus 100, which uses batteries for power. However, in the case of a device such as an HDD (magnetic disk), there are some devices that require several seconds until the HDD can read or write when resuming. This may affect the timing of image shooting immediately after the suspend recovery time. So, a configuration is adopted in which it is possible for the user to select whether or not the suspend function will be activated with a menu screen or the like in the image pickup apparatus 100, using the operating unit 28 of the image pickup apparatus 100.

That is, irrespective of the performance and function of the recording device 400 connected with the USB connection, it is possible to set the suspend function to be active or inactive. Thus, low power consumption is emphasized when the suspend function is activated, and responsiveness is emphasized when the suspend function is inactivated. The menu screen in such a case is, for example, shown in FIG. 8.

Figure 8:
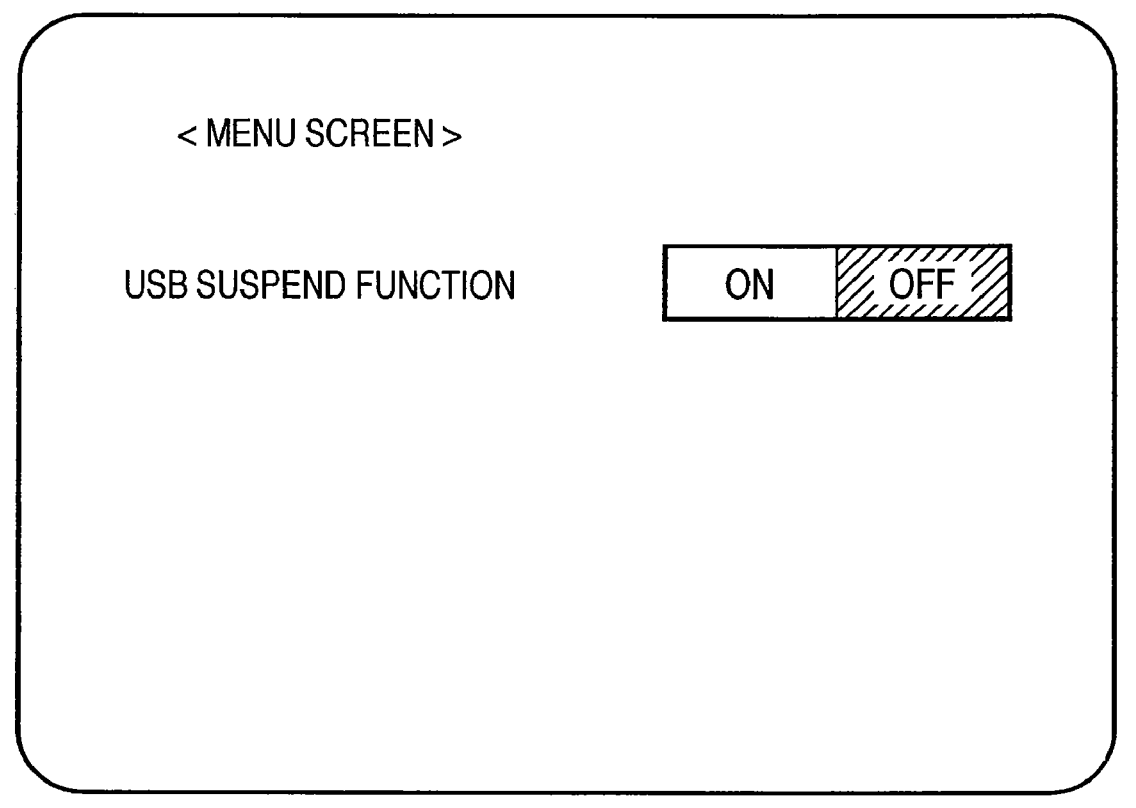
Figure 9A:
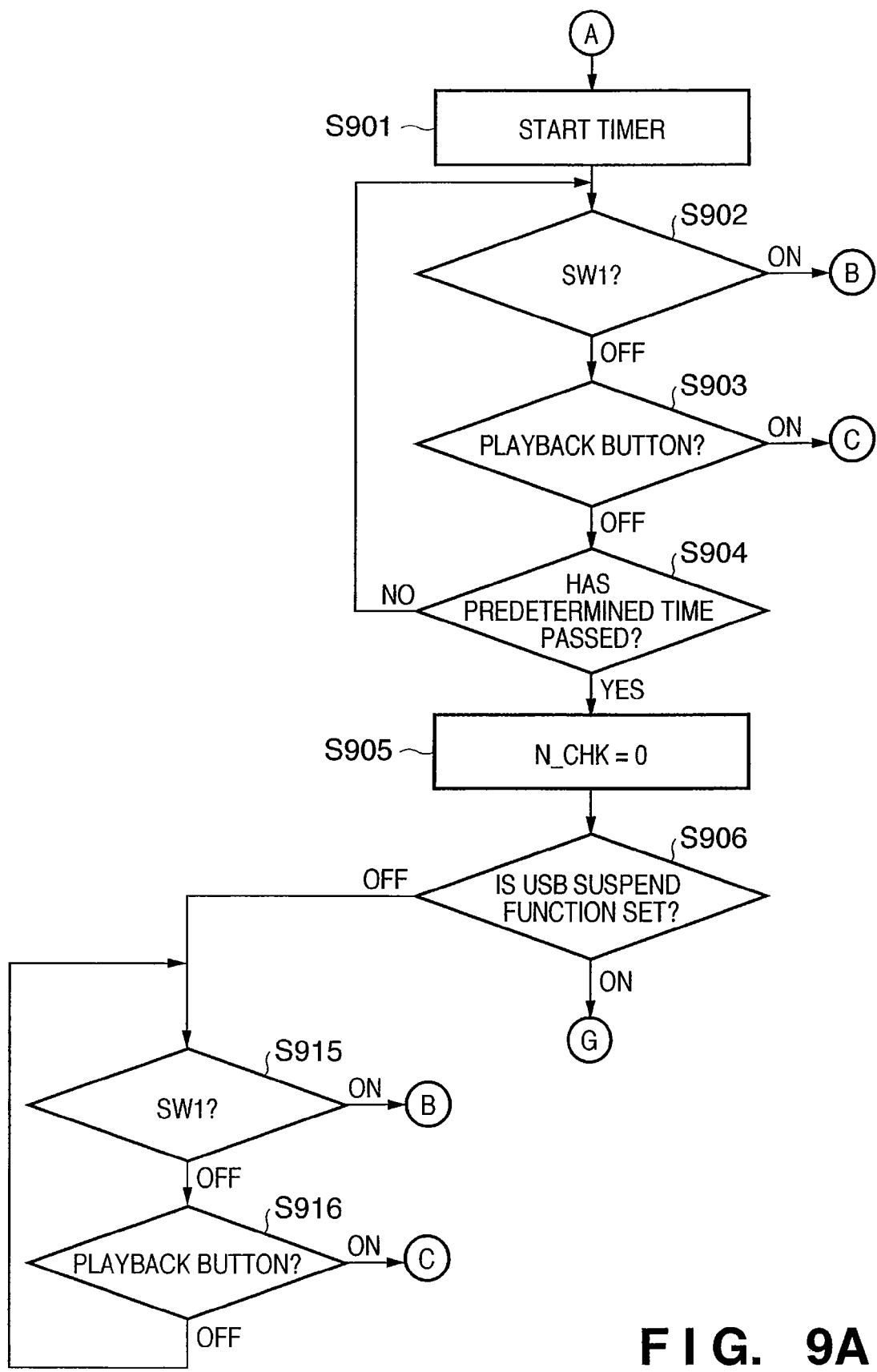
FIGS. 9A and 9B are diagrams showing the timing sequence of switching to the suspend state when the suspend function of the image pickup apparatus has been selected.
Figure 9B:
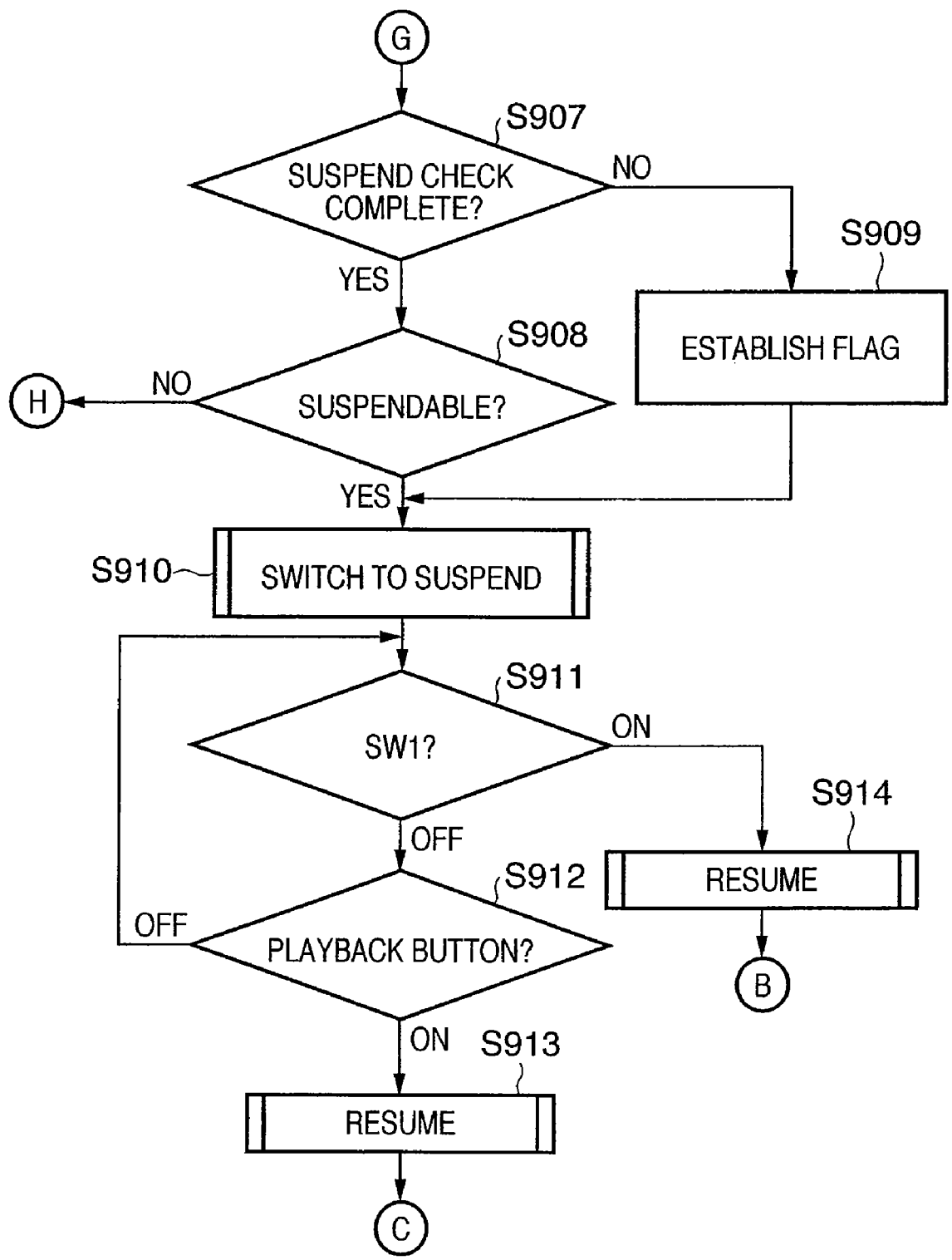

FIGS. 9A and 9B show a sequence performed when the USB suspend function is set to ON or OFF with the menu screen in FIG. 8. In Step S906 in FIG. 9A, a check is performed of whether the USB suspend function is set to ON or OFF with the menu screen, thus providing a, branch. When the USB suspend function is set to ON, as shown in FIG. 9A, the same sequence as described in FIG. 4A is executed, and when the USB suspend function is set to OFF, the image pickup apparatus 100 waits in the ordinary state without using the suspend function even when there is not operation of the image pickup apparatus 100. Other states are the same as described with reference to FIG. 4A, and so here they are shown in the sequence but a description is omitted.

Figure 10:
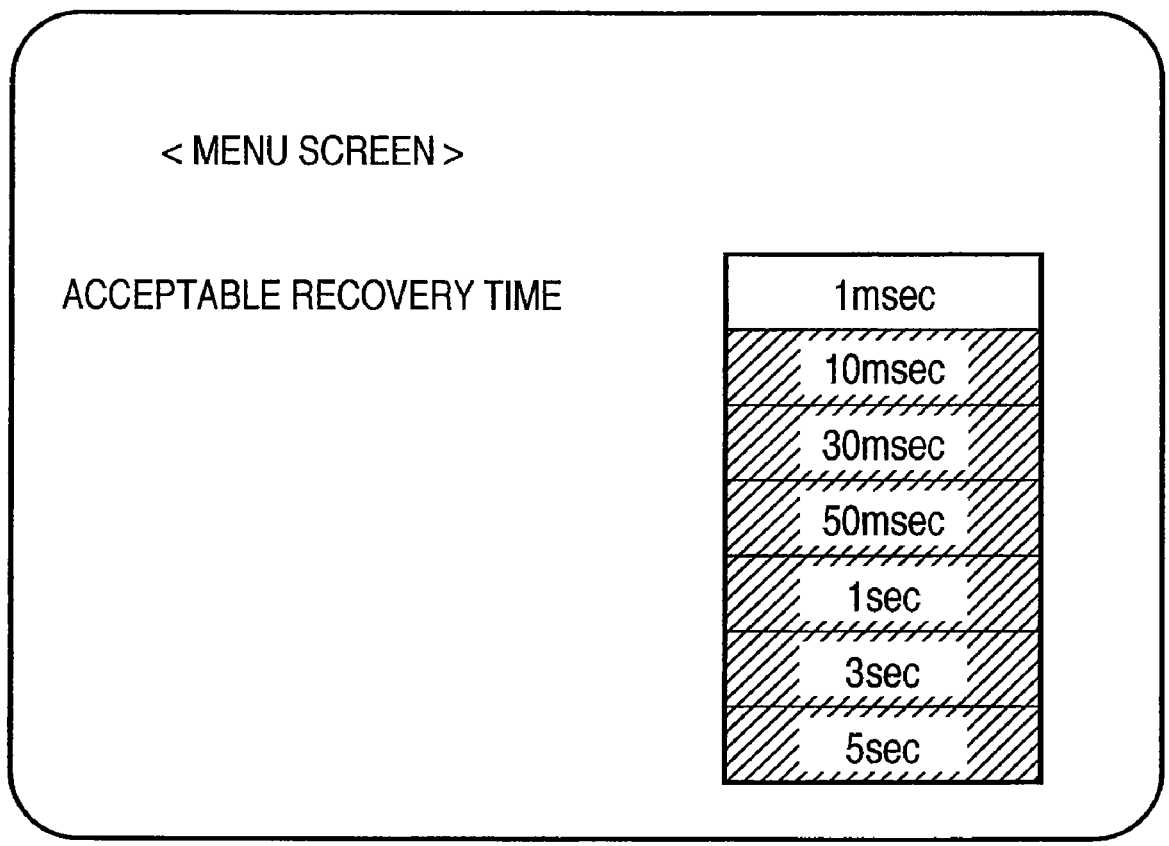
FIG. 10 shows a setting screen for the acceptable recovery time when the image pickup apparatus resumes.

Also, as shown in FIG. 10, it is possible to set the acceptable recovery time, which is an acceptable value for the time to recover when resuming, from a menu screen or the like. The total of the recovery time prescribed to be within 20 milliseconds in the USB connection standards, and the time until the magnetic disk of the HDD reaches a state in which reading and writing are possible, greatly affects the responsiveness of the image pickup apparatus 100. Thus, due to an acceptable recovery time being set as desired by the user, shutter release timing is not overlooked and thus it is possible to further improve usability.

In the above description, a digital camera was described as an example of the image pickup apparatus used as an electronic device, when a battery operated electronic device is used as the host machine, of course the present invention can be effectively applied in a USB connection between various types of electronic devices, and is not limited to digital cameras.

Other Embodiments

The object of the invention is also realized by supplying a system or an apparatus with a storage medium (or recording medium) on which program code realizing the functions of the aforementioned embodiments has been recorded, a computer (or a CPU or MPU) of that system or apparatus reading and executing the program code stored on that storage medium. In this case, the program code itself read from the storage medium realizes the functions of the aforementioned embodiments, and the present invention is configured from the storage medium on which that program code is stored. Also, the functions of the aforementioned embodiments are realized by executing the program code read by the computer. Further, the present invention encompasses a case in which an operating system (OS) operating on the computer or the like executes part or all of the actual processes based on the instructions of that program code, and the functions of the aforementioned embodiments are realized by those processes.

Further, the present invention encompasses a case in which the program code read from the storage medium may be written to a memory provided in a function expansion card inserted in the computer or a function expansion unit connected to the computer, and after the program is written to the memory, based on the instructions of that program code, a CPU or the like provided in that function expansion card or function expansion unit performs part or all of the actual processes, and the functions of the embodiments described above are realized by those processes.

When the present invention is applied to the above storage medium, program code corresponding to the flowcharts described above is stored on that storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-113748, filed Apr. 17, 2006, which is hereby incorporated by reference herein in its entirety.

What is claimed is:

1. An electronic device comprising:
   a connection unit configured to connect an external device to the electronic device;
   a power supply unit configured to supply power to the external device via the connection unit;
   a judgment unit configured to judge whether or not the external device connected to the connection unit is compatible with a low power consumption state; and
   a control unit configured, if the judgment unit judges that the external device is compatible with the low power consumption state, to control the power supply unit so as to allow the external device to switch to the low power consumption state and otherwise, not to control the power supply unit so as to allow the external device to switch to the low power consumption state.

2. The electronic device according to claim 1, wherein the judgment unit is further configured to judge whether or not the external device satisfies a predetermined condition related to the low power consumption state, the predetermined condition being that at least any one of the time for the connected external device to switch to the low power consumption state, the time for recovery from the low power consumption state, and the power consumption in the low power consumption state, is not more than a predetermined value, and
   if the judgment unit judges that the predetermined condition is not satisfied, the control unit does not control the power supply unit so as to allow the external device to switch to the low power consumption state even if the judgment unit judges that the external device is compatible with the low power consumption state.

3. The electronic device according to claim 1, wherein irrespective of the results of the judgment, it is possible to prohibit the connected external device from switching to the low power consumption state.

4. The electronic device according to claim 1, wherein the electronic device is an image pickup apparatus.

5. The electronic device according to claim 1, wherein the connected external device is a disk recording device.

6. The electronic device according to claim 1, wherein the connection unit connects the external device in accordance with USB standards.

7. The electronic device according to claim 1, wherein the electronic device is battery operated.

8. The electronic device according to claim 1, further comprising:
   a storing unit configured to store a judgment result by the judgment unit as to whether or not the external device is compatible with the low power consumption state,
   wherein if the judgment result is stored by the storing unit, the judgments unit does not judge whether or not the external device is compatible with the low power consumption state and the control unit performs the control of power supply unit based on the judgment result stored by the storing unit.

9. The electronic device according to claim 6, wherein the low power consumption state is a suspended state in accordance with USB standards.

10. A method for an electronic device to control an external device, the method comprising:
    a connection step of connecting an external device to the electronic device;
    a power supply step of supplying power to the external device connected in the connection step;
    a judgment step of judging whether or not the external device connected in the connection step is compatible with a low power consumption state; and
    a control step of, if it is judged in the judgment step that the external device is compatible with the low power consumption state, controlling the supply of power so as to allow the external device to switch to the low power consumption state and otherwise, of not controlling the power supply unit so as to allow the external device to switch to the low power consumption state.

11. The method for controlling an external device with an electronic device according to claim 10, wherein the judgment step further comprises:
    judging whether or not the external device satisfies a predetermined condition related to the low power consumption state, the predetermined condition being that at least any one of the time for the connected external device to switch to the low power consumption state, the time for recovery from the low power consumption state, and the power consumption in the low power consumption state, is not more than a predetermined value; and if the predetermined condition is not satisfied, not controlling the power supply unit so as to allow the external device to switch to the low power consumption state even if the judgment unit judges that the external device is compatible with the low power consumption state.

12. The method for controlling an external device with an electronic device according to claim 10, wherein irrespective of the results of the judgment, it is possible to prohibit the connected external device from switching to the low power consumption state.

13. The method for controlling an external device with an electronic device according to claim 10, wherein the electronic device is an image pickup apparatus.

14. The method for controlling an external device with an electronic device according to claim 10, wherein
the electronic device is an image pickup apparatus, and
the connected external device is a disk recording device.

15. The method for controlling an external device with an electronic device according to claim 10, wherein
in the connection step, the external device is connected in accordance with USB standards.

16. The method for controlling an external device with an electronic device according to claim 10, wherein the electronic device is battery powered.

17. A program, stored in a computer-readable storage medium, which when loaded into a programmable electronic device and executed performs a method as claimed in claim 10.

18. A machine-readable storage medium to which a program is stored, wherein the program when loaded into a programmable electronic device and executed, performs a method as claimed in claim 10.

19. The method for controlling an external device with an electronic device according to claim 10, further comprising:
a storing step of storing the judgment result in the judging step as to whether or not the external device is compatible with the low power consumption state, wherein if the judgment result is stored in the storing step, the judgment step does not judge whether or not the external device is compatible with the low power consumption state and the control step performs the control of supply of power based on the judgment result stored in the storing step.

20. The method for controlling an external device with an electronic device according to claim 15, wherein the low power consumption state is a suspended state in accordance with USB standards.

* * * * *